US006728629B2

(12) United States Patent
Oka et al.

(10) Patent No.: US 6,728,629 B2
(45) Date of Patent: Apr. 27, 2004

(54) ON-ROAD REFERENCE POINT POSITIONAL DATA DELIVERY DEVICE

(75) Inventors: Kenichiro Oka, Tokyo (JP); Hiroyoshi Suzuki, Tokyo (JP)

(73) Assignee: National Institute for Land and Infrastructure Management, Ministry of Land, Infrastructure and Transport, Tsukuba (JP)

( * ) Notice: Subject to any disclaimer, the term of this patent is extended or adjusted under 35 U.S.C. 154(b) by 169 days.

(21) Appl. No.: 09/991,087

(22) Filed: Nov. 16, 2001

(65) Prior Publication Data

US 2002/0065600 A1 May 30, 2002

(30) Foreign Application Priority Data

Nov. 24, 2000 (JP) ....................................... 2000-357344
Mar. 8, 2001 (JP) ....................................... 2001-065800

(51) Int. Cl.7 ......................... G01C 21/00; G06F 19/00; G06G 7/70; G08G 1/095; G08G 1/07

(52) U.S. Cl. ....................... 701/200; 701/117; 701/207; 701/223; 340/907; 340/909; 340/910; 340/463; 342/46; 342/50

(58) Field of Search ................................ 701/117, 200, 701/207, 217, 223; 340/907, 909, 910, 463; 342/46, 50

(56) References Cited

U.S. PATENT DOCUMENTS 77,741 A * 5/1868 Lane ............................ 52/89
4,220,946 A * 9/1980 Henriot ...................... 340/994
4,357,593 A * 11/1982 von Tomkewitsch ....... 340/988
5,381,095 A * 1/1995 Andrews .................... 324/326
5,938,707 A * 8/1999 Uehara ........................ 701/41
5,987,374 A * 11/1999 Akutsu et al. .............. 701/117
6,263,266 B1 * 7/2001 Hawthorne .................. 701/19

FOREIGN PATENT DOCUMENTS

| | | |
|---|---|---|
| JP | 07-128420 | 5/1995 |
| JP | 07-141590 | 6/1995 |
| JP | 08-018498 | 1/1996 |
| JP | 08-314540 | 11/1996 |
| JP | 10-122870 | 5/1998 |
| JP | 10-162300 | 6/1998 |
| JP | 11-153445 | 6/1999 |
| JP | 2000-113257 | 4/2000 |
| JP | 2000-235414 | 8/2000 |

* cited by examiner

*Primary Examiner*—William A. Cuchlinski, Jr.
*Assistant Examiner*—Brian J. Broadhead
(74) *Attorney, Agent, or Firm*—Flynn, Thiel, Boutell & Tanis, P.C.

(57) ABSTRACT

The on-road reference point positional data delivery device according to the present invention has a reference point positional data delivery device, and this reference point positional data delivery device has a beacon identification device for indicating a reference point position for service information delivered from a beacon provided on a road to a vehicle and also selecting the beacon delivering the service information from among a plurality of beacons.

14 Claims, 12 Drawing Sheets

ON-ROAD REFERENCE POINT POSITIONAL DATA DELIVERY DEVICE

FIELD OF THE INVENTION

This invention relates to a reference point data delivery device for providing vehicles running on a road with various types of information.

BACKGROUND OF THE INVENTION

The situation in which a vehicle running on a road receives service information from the road through road-to-vehicle communication from beacons installed on the road is as shown in FIG. 20. Beacons 2*a*, 2*b* installed on a road 1 offer different service information respectively via a radio communication. A vehicle 3 running on the road can communicate with the beacon 2*a* in an area 4*a*, with he beacon 2*b* in an area 4*b*, and with the beacons 2*a*, 2*b* in an area 4*c* respectively.

The vehicle 3 has an in-vehicle unit for performing road-to-vehicle communication with the beacons 2*a*, 2*b*, and receives, when the vehicle enters a communication-enabled area, service information from each beacon through a narrow area communication. The service information offered by the beacons 2*a*, 2*b* include but are not limited thereto, information concerning an obstacle such as a disabled car or a fallen object, information concerning an upcoming surface situation of the road surface weather conditions, information concerning traffic jams, information concerning road construction, information on running restrictions, and information concerning a parking area.

With the system based on the conventional technology as described above, however, as road-to-vehicle communication is performed between beacons and a vehicle, information delivery is performed within a narrow area, and when it is necessary to provide such information as "There is a disabled car 500 m ahead" for indicating a point on the road in the traveling direction, where the reference point is located cannot be understood with a beacon having a relatively wide communication-enabled area. Further, when two types of beacons 2*a*, 2*b* offer different types of service information and the communication-enabled areas overlap to some extent, a vehicle having received the service information from the beacons cannot correctly determine whether the respective service information relates to a situation in the traveling direction or not, and therefore the vehicle cannot correctly receive the service.

SUMMARY OF THE INVENTION

It is an object of the present invention to provide an on-road reference point data delivery device which can solve the problems in the conventional technology as described above and enables a vehicle running on a road to select a beacon offering information to be accessed and also to precisely identify a position indicated in the service information.

It is another object of the present invention to provide an on-road reference point data delivery device which enables a vehicle running on a road to accurately receive service information even within a very short traveling distance and also to precisely detect a reference point corresponding to the delivered service information.

To achieve the objects described above, the on-road reference point data delivery device has a reference point data delivery means, and this reference point data delivery means indicates a reference point for the service information delivered from a beacon installed on a road by means of road-to-vehicle communication, and also has a beacon identification means which selects a beacon corresponding to the delivered service information from among a plurality of beacons.

As the on-road reference point data delivery device has the configuration and especially the beacon identification means as described above, the reference point data delivery means indicates a service reference point on a road for the service information delivered from a beacon, and in addition the beacon identification means selects and communicates with a beacon delivering the service information required by a vehicle, so that the on-road reference point data delivery device can precisely identify a position indicated by the service information depending on a position where the device receives the service information from the reference point data delivery means as a reference point.

Further the on-road reference point data delivery device according to the present invention comprises a road-to-vehicle communication radio beacon having a narrow communication area in the extending direction of the road and is installed on a road for delivering at least data on a reference point distance between a reference point and a forward point indicated by forward road information concerning, for instance, a narrower road in the forward direction or an absolute position on the road to a vehicle running in the communication area on the road, and a reference marker installed within a communication area of a road-to-vehicle communication radio beacon on a road for indicating a reference point distance of a reference point for an absolute position on the actual road, while in a vehicle a reception means for receiving signals from the road-to-vehicle communication radio beacon, a reference point marker detection means, and a reference point detection means for determining that the vehicle has entered a communication area of a road-to-vehicle communication radio beacon or passed over a reference point marker, also for determining the reference point marker which the vehicle has just passed over as a reference point.

With the configuration described above, the road-to-vehicle communication radio beacon delivers at least data concerning a reference point distance up to a point indicated by forward road information such as a narrower road in the forward direction or a position on the road, and the reference point marker indicates a reference point distance or a reference point for an absolute position on the actual road, so that the vehicle receives the signals from a reception means loaded on the vehicle for receiving signals from the road-to-vehicle communication beacons and determines that the vehicle has entered a communication area of the road-to-vehicle communication beacon, recognizes with the reference point detection means that the vehicle has passed over a reference point marker, and identifies a position of the reference point marker as a reference position. Therefore, the vehicle can accurately receive service information even within a very short traveling distance and also can precisely detect a reference point corresponding to the service information.

DETAILED DESCRIPTION OF THE PREFERRED EMBODIMENTS

Figure 1:
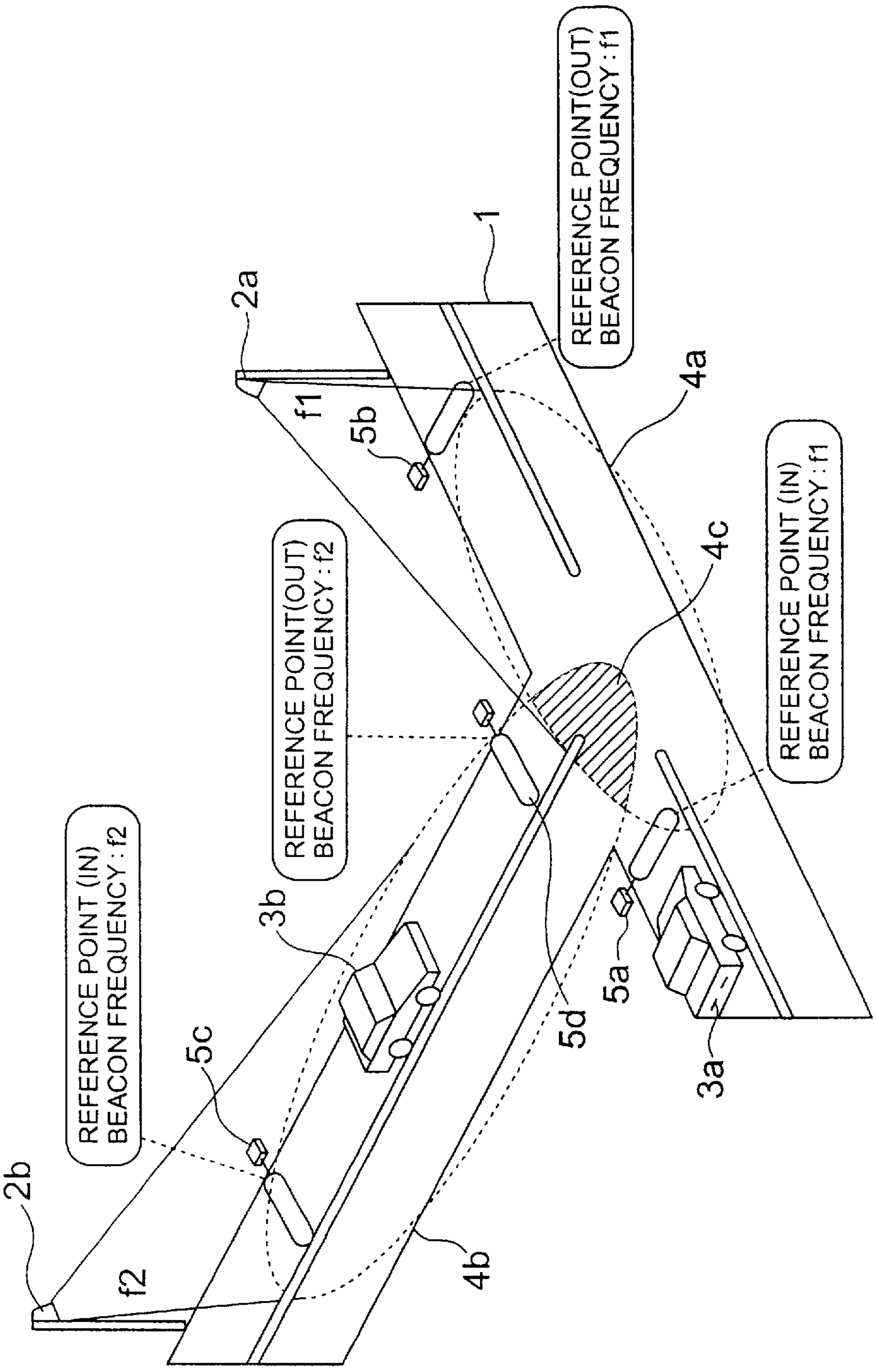
FIG. 1 is a perspective view showing general configuration of Example 1 in one embodiment of the present invention.
Figure 2:
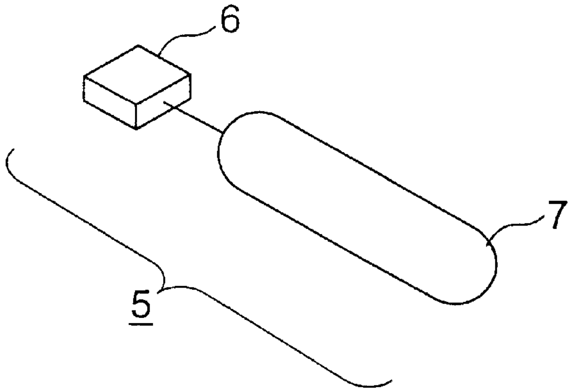
FIG. 2. is a perspective view showing a reference point data delivery means in Example 1 of the embodiment.

The embodiment shown in the figures is described below with reference to the examples shown in the drawings. FIG. 1 to FIG. 8 show one embodiment of the present invention. FIG. 1 and FIG. 2 show an arrangement, in Example 1 of this embodiment, of beacons and reference point positional data delivery means near a confluence point of a road with a side road, and in this figure, designated at the reference numeral 1 is a road, at 2*a* and 2*b* road-to-vehicle communication radio beacons are each provided at the side of the road 1 or at a similar position and having a communication area 3 within a specified range on the road surface, at 3*a* and 3*b* vehicles, at 4*a*, 4*b* and 4*c* areas where the vehicles can communicate with the beacons, and at 5*a*, 5*b*, 5*c*, and 5*d* lane markers based on the radio system as reference point positional data delivery means 5 respectively. As shown in FIG. 2, the reference point positional data delivery means 5 comprises an on-road processor section 6 and a transmission loop antenna section 7. The transmission loop antenna section 7 is buried in a surface of the road.

The on-road processor section 6 stores data to be notified to the vehicles 3*a*, 3*b*, and transmits the data from the transmission loop antenna section 7 by controlling communication with the vehicles. The loop antenna section 7 emits data signals with modulated electrical waves to the vehicles 3*a*, 3*b* passing over it. The data transmitted from the lane markers 5*a*, 5*b*, 5*c*, and 5*d* as reference point positional data delivery means 5 to the vehicles 3*a*, 3*b* include, but not limited to, for instance, corresponding beacon ID code, marker type, lane number of each vehicle, and number of lanes.

A frequency for identifying each of the beacons 2*a*, 2*b* from which an information delivery service is received and allocated to the corresponding beacon identification code. A lane marker used as a reference point is used not only in combination with a beacon, but independently for delivering information. In a case of routine information including only a small quantity of data, the lane marker for a reference point independently delivers the information. For instance, the lane marker delivers information concerning a start point and an end point of a sharp bend as well as a start point and an end point of a reduced speed area. A start point and an end point of a zone are shown as marker types of service-IN and service-OUT respectively. When dynamic information from the outside such as information from an obstacle sensor, traffic information, or information on weather conditions is provided, the beacon provides the service information, and the lane marker for a reference marker plays a role of specifying the beacon. When the lane marker for a reference point is not combined with any beacon, the beacon identification code is null.

The vehicle 3*a* receives, when it passes over the lane marker 5*a* based on the radio system, information with a radio wave marker detector loaded thereon. In this example, the lane marker sends electrical waves as signals, so that the vehicle receives the electrical waves. As reference point information, a start point on an information delivery service zone is indicated (as IN) by the beacon 2*a*. This point is also a start point for the positional information included in the information delivered by the beacon 2*a*. The vehicle 3*a* also reads from the lane marker 5*a* that a frequency of signals from the beacon 2*a* is f1.

After the vehicle 3*a* passes over the lane marker 5*a*, when it goes into a communication-enabled area 4*a* with the beacon 2*a* having the frequency of f1, the vehicle 3*a* communicates with the beacon 2*a*, and receives delivery of service information. Although the vehicle 3*a* passes through an area 4*c* where it can communicate also with the beacon 2*b* during running, as signals from the beacon 2*b* are transmitted with a different frequency f2, the vehicle does not receive service by the beacon 2*b*.

In a case where positional information such as "500 m ahead" is included in the information delivered from the beacon 2*a*, the vehicle 3*a* computes a current position from the position when it passes over the lane marker 5*a* as a reference point to determine how many meters the position indicated by the information of "500 m ahead" delivered from the beacon 2*a* is. The vehicle 3*a* replaces the distance with the computed distance and displays the service information on a display unit in the vehicle or alert the driver of the information with, for instance, sounds.

When the vehicle 3*a* passes over the lane marker 5*b*, the vehicle 3*a* receives a signal indicating and end (OUT) of the service zone as reference point information from the beacon 2*a*. Upon reception of the signal OUT, communication with the beacon 2*a* is terminated. It is conceivable that, when the point indicated by the information of "500 m ahead" from the beacon 2*a* is still ahead, appropriate notification is provided to the vehicle's driver updating the distance to the point with a display or sounds in the vehicle.

On the other hand, when the vehicle 3*b* passes over the lane marker 5*c*, the vehicle 3*b* receives information from the beacon 2*b*. A signal indicating start of an information delivery service zone (IN) is received as reference point information from the beacon 2*b*. This point is also a start point included in the information delivered from the beacon 2*b*. Also the vehicle 3*b* determines from the lane marker 5*c* that a frequency of the signal from the beacon 2*a* is f2.

When the vehicle 3*b* passes over the lane marker 5*c* and enters an area 46 where communication with the beacon 2*b* is enabled, the vehicle 3*b* starts communication with the beacon 2*b* at the frequency f2, and receives the service information delivered from the beacon 2*b*. While running, the vehicle 3*b* also passes through an area 4*c* where also communication with the beacon 2*a* is simultaneously enabled, as the beacon 2*a* works with the different frequency f1, the vehicle 3*b* does not receive service by the beacon 2*a*. The vehicle 3*b* also receives a signal indicating an end of the service zone by the beacon 2*b* (OUT) as reference point information when it passes over a lane marker 5*d*. With this, communication with the beacon 2*b* is terminated.

As described above, the vehicles 3*a*, 3*b* can selectively receive signals indicating reference points and frequencies for the particular beacons 2*a*, 2*b*, so that the vehicles 3*a*, 3*b* can receive only information from either one related beacon 2*a* or 2*b* according to a lane on which the vehicle is running. In addition, the vehicles 3*a*, 3*b* can receive positional information included in the service information with high precision.

Although description of this example assumes a system in which a lane marker transmits electrical waves, a system is allowable in which a lane marker reflects electrical waves. In this case, a vehicle transmits electrical waves to a road surface and receives the electrical waves reflected from a lane marker, thus the same effect as that described above being achieved.

Although description of this example assumes a system in which a lane marker transmits electric waves, a system is allowable in which a lane marker reflects electric waves. In this case, a vehicle transmits electric waves to a road surface and receives the electric waves reflected from a lane marker, thus the same effect as that described above being achieved.

Figure 3:
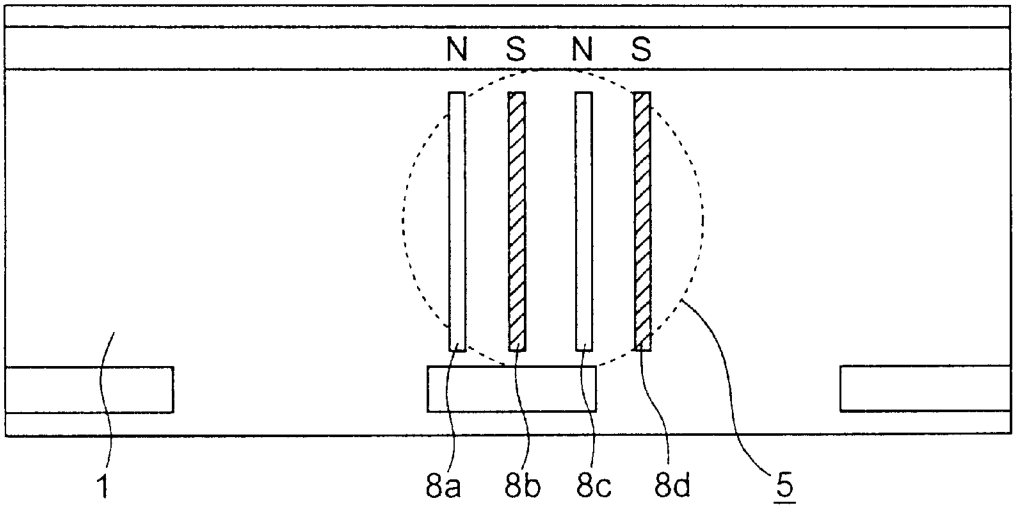
FIG. 3 is a flat view showing the reference point data delivery means in Example 2 of the embodiment.

FIG. 3 shows an example of the reference point data delivery means 5 in which a lane marker for a reference marker is formed with a plurality of pieces of magnets. Zones comprising zonal magnets 8*a*, 8*c* buried with the N pole upward and those comprising magnets 8*b*, 8*d* buried with the S pole upward are provided in a lane 1 on the road 1. In this case, assuming that a vehicle has a magnetism detector loaded thereon and runs from the left-hand side to the right-hand side in the figure, when the vehicle passes over the magnets 8*a*, 8*b*, 8*c*, and 8*d* successively, the vehicle reads the code of "NSNS" by fetching detected data from the magnetism detector in the time course. If the frequency f1 is assigned to the code of "NSNS", the vehicle can determine that the beacon providing the current service works with the frequency f1 and that a service zone by the beacon has started. It is also possible to include, in addition to specification of a frequency, a marker type, namely service IN or service OUT.

Figure 4:
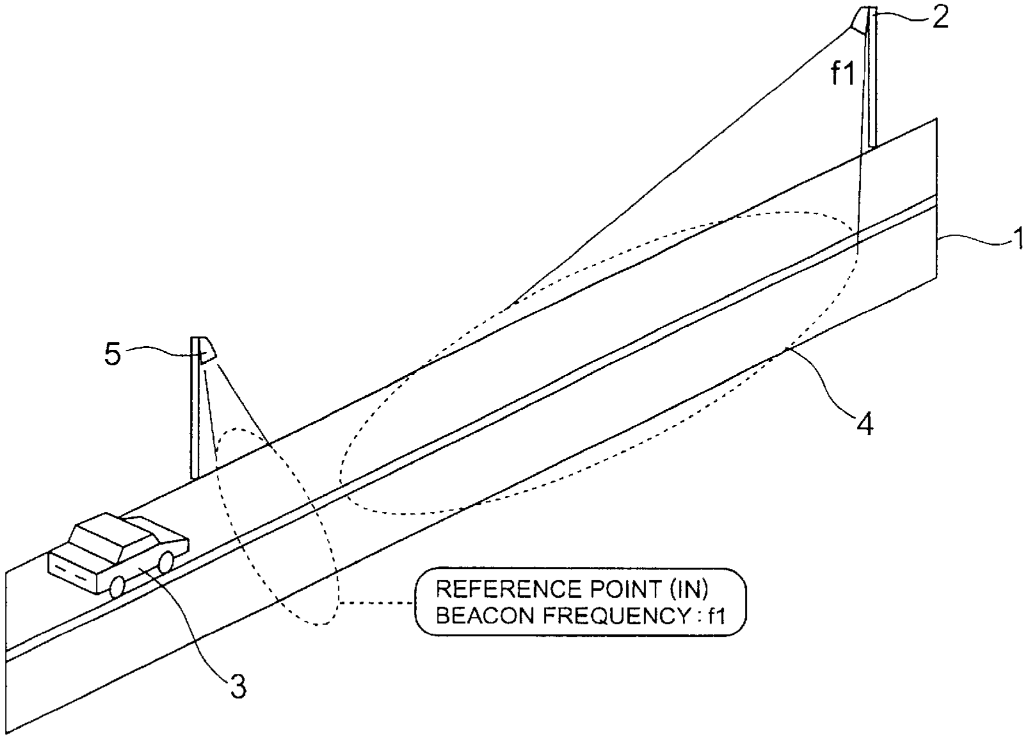
FIG. 4 is a perspective view showing the reference point data delivery means in Example 3 of the embodiment.

FIG. 4 shows an example in which a narrow area communication means is used as the reference point positional data delivery means 5 in Example 3. The reference positional data delivery means 5 is a facility like the beacon 2 providing the service as described above, but the communication-enabled area is set to an extremely narrow area to use the means 5 as a start point. In this example, also like in Example 1 or 2, the reference point positional data delivery means 5 delivers the reference point information and a frequency of the beacon 2 to the vehicle 3. To prevent the vehicle 3 from failing in detection of the reference point positional data delivery means 5, a particular frequency is allocated to the reference point positional data delivery means 5. When the reference point positional data delivery means 5 and the beacon 2 for delivery of service information employs the same communication method, the detector loaded on the vehicle 3 can be used to communicate with both of the reference point positional data delivery means 5 and the beacon 2.

Figure 5:
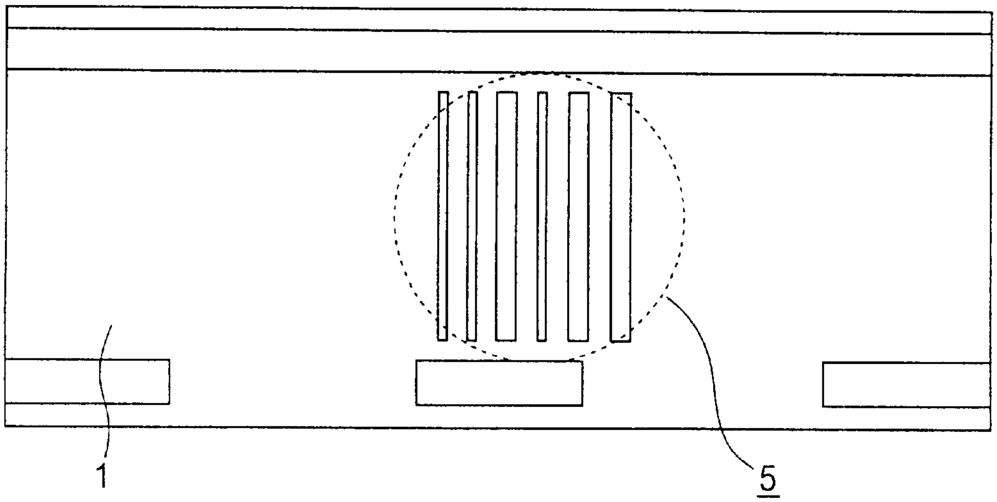
FIG. 5 is a flat view showing the reference point data delivery means in Example 4 of the embodiment.

FIG. 5 shows an example in which the reference point positional data delivery means 5 comprises a collection of a plurality of zonal bodies applied or adhered to a road surface in Example 4. In this example, there are two types of zonal bodies, one having a large width, and the other having a small width, and a code is expressed with the arrangement of the two types of zonal bodies. The code includes information concerning a frequency of the beacon, marker type, or the like. Assuming that a camera is loaded on the vehicle, the vehicle camera can read the code expressed by the reference point positional data delivery means 5 by photographing the collection of zonal bodies with the camera and processing the image. By analyzing the code, it is possible to take out information concerning a frequency of a beacon from which the service is received, marker type or the like.

Figure 6:
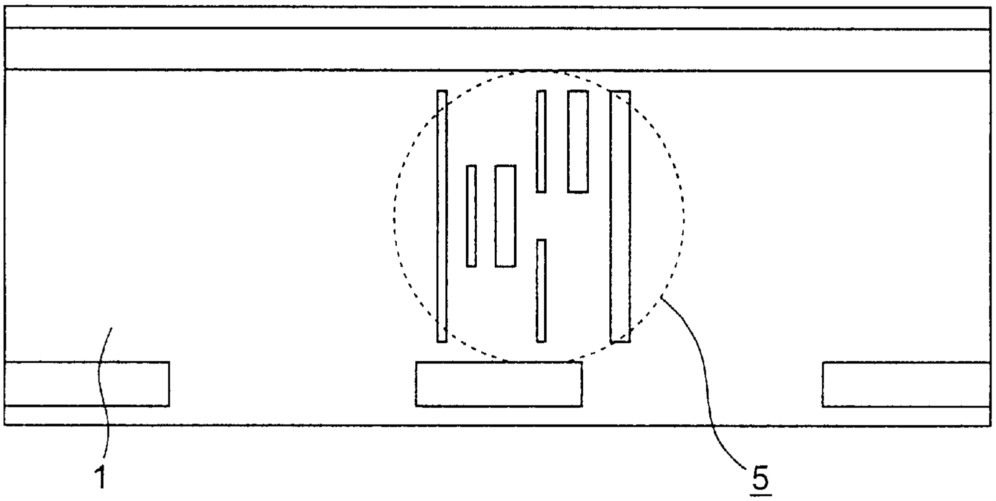
FIG. 6 is a flat view showing the reference point data delivery means in Example 5 of the embodiment.

FIG. 6 shows an example in which the reference point positional data delivery means 5 comprises a collection of a plurality of zonal bodies like those used in Example 4, and there are various types of zonal bodies including those having a small width, those having a large width, long ones, short ones, those positioned at a center or along a side of a road, single ones extending in a lateral direction of a lane, or pairs of parallel ones. With the various types of configurations as described above, the reference point positional data delivery means 5 can store therein a larger quantity of information in a restricted area as compared to Example 4.

Figure 7:
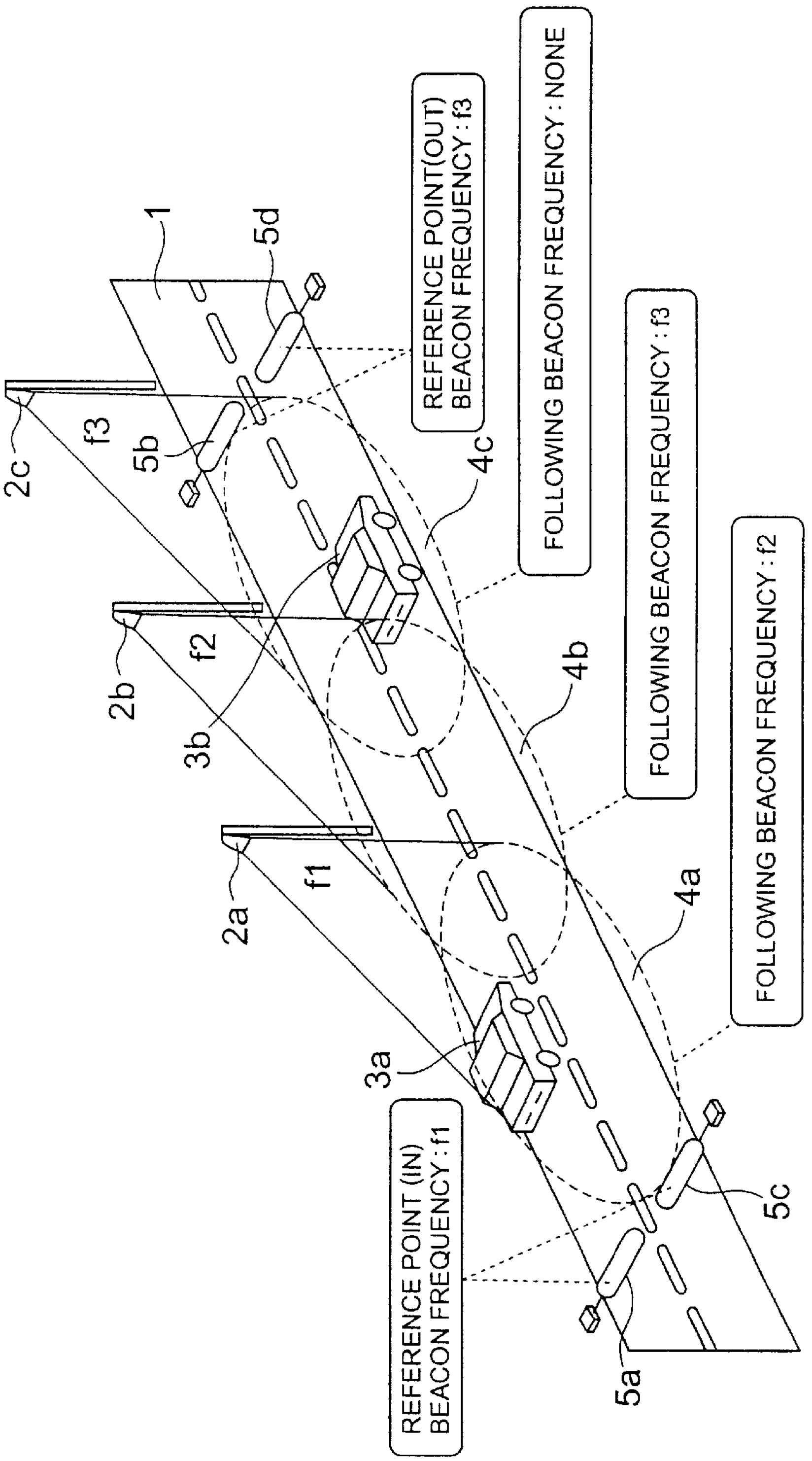
FIG. 7 is a perspective view showing general configuration of Example 6 in the embodiment.

FIG. 7 shows an example in which a plurality of beacons providing the same service information but working at different frequencies respectively are serially provided on a road. FIG. 7 shows an example in which three units of beacons 2*a*, 2*b*, 2*c* are serially provided and working at the frequencies of f1, f2, and f3. The reference point positional data delivery means is a lane marker based on a radio system similar to that in Example 1, and reference point lane markers 5*a*, 5*b* for service IN and reference point lane markers 5*b*, 5*d* for service OUT are provided on two lanes respectively. The code generated by the reference point lane markers 5*a*, 5*c* for service IN includes a frequency of communication with the first beacon 2*a*. The first beacon 2*a* generates information including a frequency of f2 for the second beacons 2*b*, the second beacon 2*b* generates information including a frequency of f3 for the third beacon 2*c*, and the third beacon 2*c* generates information including no frequency data.

The vehicle 3*a* or 3*b* senses, when passing over the lane marker 5*a* or 5*c*, that communication with the beacon 2*a* at the frequency f1 has been enabled and sets the communication frequency to f1 to start communication with the beacon 2*a*. When communication with the beacon 2*a* in an area 4*a* has been finished, the vehicle 3*a* or 3*b* sets the frequency to f2 obtained from the beacon 2*a* to start communication with the second beacon 2*b* and waits for establishment of the communication link. When the vehicle 3*a* or 3*b* enters an area 4*b* where communication with the second beacon 2*b* is enabled, the vehicle 3*a* or 3*b* receives the second service information from the beacon 2*b* and at the same time knows that the frequency of the third beacon 2*c* is f3. When communication with the beacon 2*b* has been finished, the vehicle 3*a* or 3*b* sets the frequency to f3, and when the vehicle 3*a* or 3*b* enters an area 4*c* where communication with the third beacon 2*c* is enabled, the vehicle 3*a* or 3*b* receives the third service information from the beacon 2*c*. At the same time, the vehicle 3*a* or 3*b* knows that there is no further beacon, and terminates communication with the beacons.

As described above, when the same service information is delivered from a plurality of beacons, the reference point positional data delivery means delivers information of a frequency of the first beacon, and each beacon provides information for a frequency of the following beacon, so that a vehicle can successively communicate with the beacons to correctly acquire service information.

Figure 8:
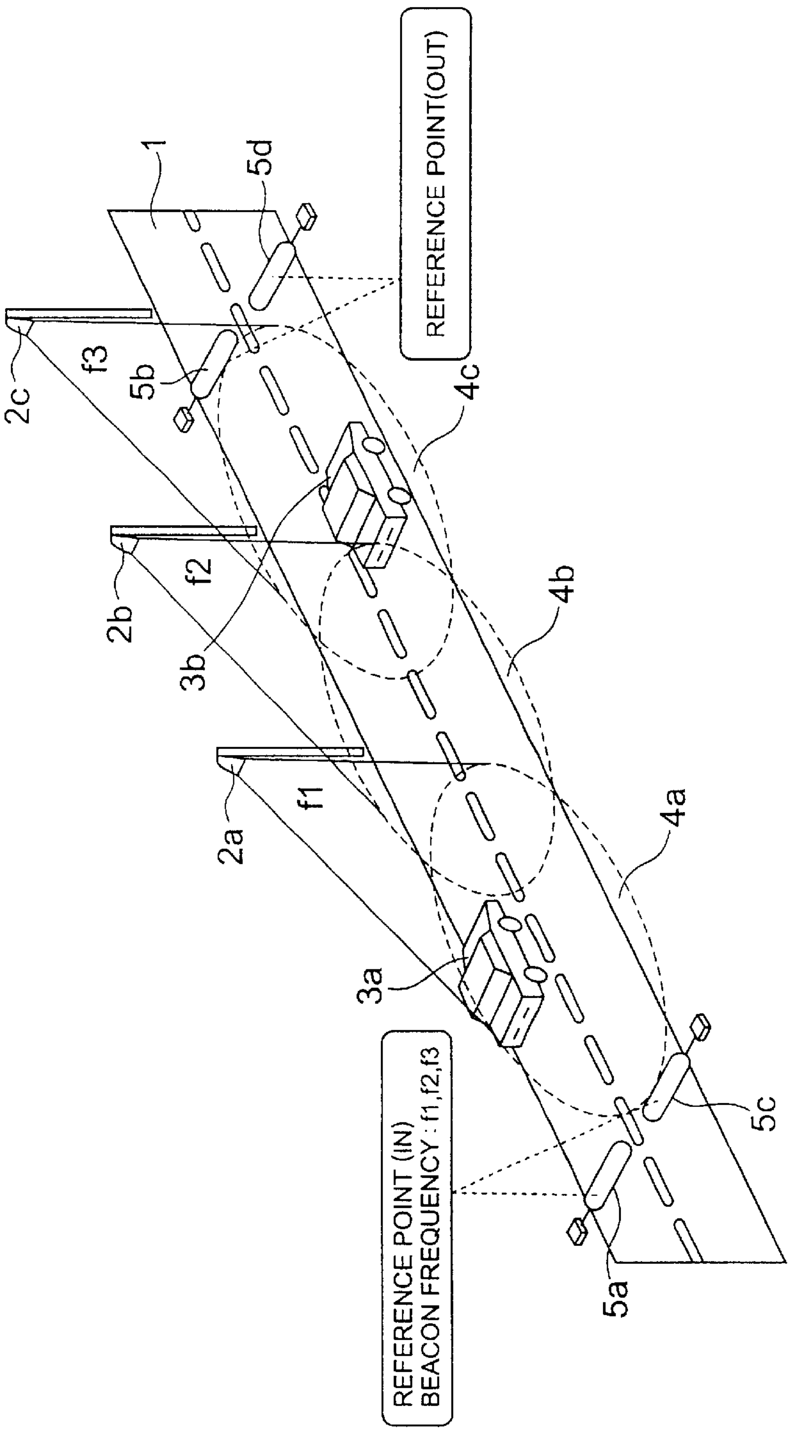
FIG. 8 is a perspective view showing general configuration of Example 7 in the embodiment.

FIG. 8 shows a case in Example 7 in which a plurality of beacons delivering the same service information but working at different frequencies respectively are provided serially on a road like in Example 6. In FIG. 8, three units of beacons 2*a*, 2*b*, and 2*c* are serially provided and work at the frequency of f1, f2, and f3. The reference point positional data delivery means is a lane marker based in the radio system like that in Example 1, and reference point lane markers 5*a*, 5*c* for service IN and reference point lane markers 5*b*, 5*d* for service OUT are provided in two lanes respectively. The code generated by the reference point lane markers 5*a*, 5*c* for service IN includes information for the frequencies f1, f2, f3 for communication with the beacons 2*a*, 2*b*, and 2*c* respectively as beacon array information. Therefore the vehicle can obtain service information correctly by successively communicating with the beacons.

Figure 9:
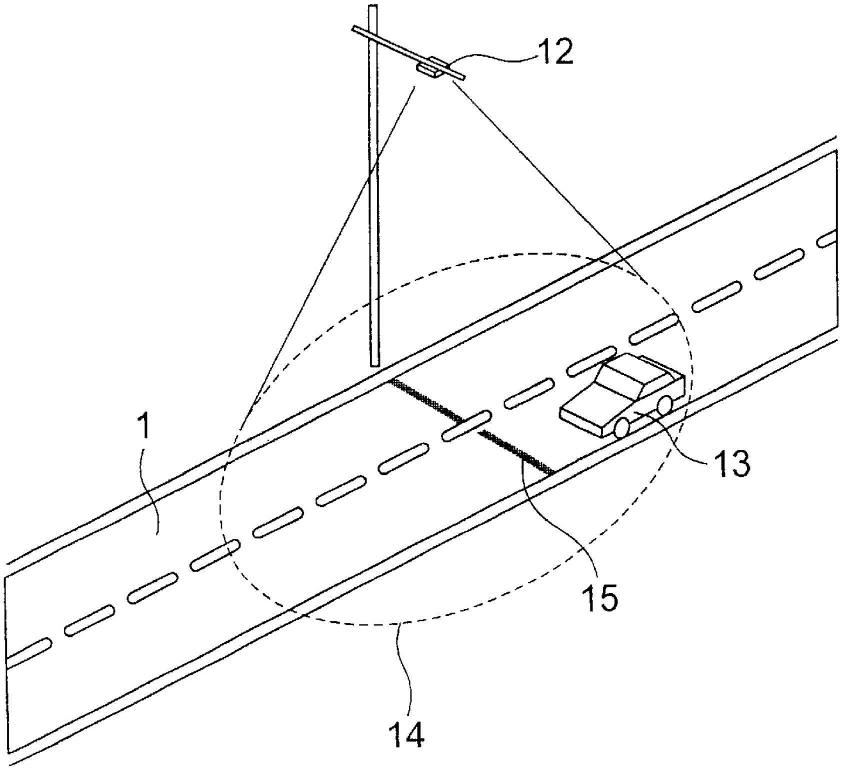
FIG. 9 is a perspective view showing general configuration of Example 1 in another embodiment of the present invention.
Figure 10:
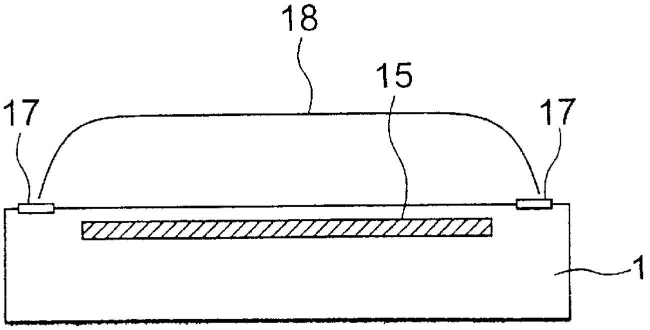
FIG. 10 is an explanatory view showing magnetic field distribution on a zonal magnetic marker in the direction lateral direction against a lane in Example 1 above.
Figure 11:
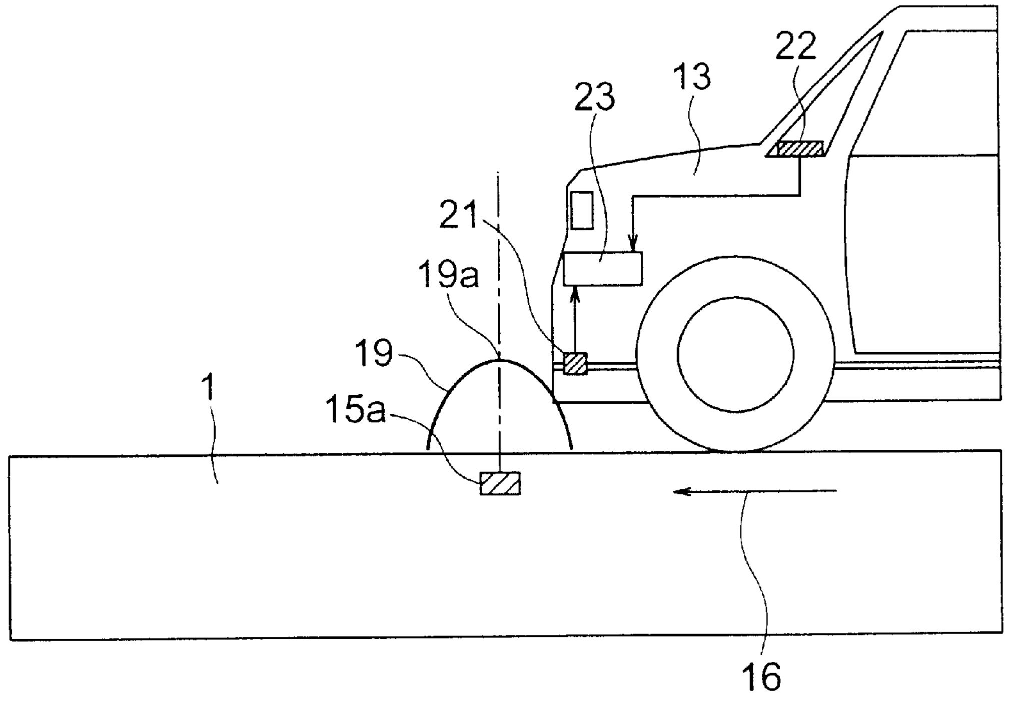
FIG. 11 is an explanatory view showing how a vehicle detects a lane marker based on a radio system and a magnetic zonal marker in Example 1 of the embodiment.

FIG. 9 to FIG. 19 show another embodiment of the present invention. FIG. 9 to FIG. 11 shows Example 1 of this embodiment. In FIG. 9, the reference numeral 15 indicates a reference point marker provided in each lane on a road surface within a communication area 14 for a radio beacon 12 for road-to-vehicle communication 15, and in this example the reference point marker 15 comprises a magnetic zonal marker which extends in a lateral direction of the lane. The reference numeral 13 indicates a vehicle, and the vehicle 13 comprises a reception means for signals from the radio beacon 12 for road-to-vehicle communications, a detection means for the magnetic zonal marker 15, and a reference position detection means. The radio beacons 12 for road-to-vehicle communications has a narrow communication area 14 with the width of at least several tens of meters so that a plurality of reference points are not present within this area.

In FIG. 10, the reference numeral 17 indicates a partition line of a lane on the road 1, and the magnetic zonal marker 15 has a length reaching a point near the partition line 17 in the lateral direction of the lane with the magnetic field distribution 18 in the lateral direction of the lane having a substantially homogeneous magnetic field amplitude along the width of the lane.

In FIG. 11, designated at the reference numeral 15*a* is a cross-sectional form of the magnetic zonal marker 15 in the direction in which the road extends, at 19*a* magnetic field distribution in the direction in which the road extends having the magnetic field amplitude in the vertical direction against the magnetic zonal marker 15, and at 19*a* a peak point of the magnetic field and a reference point on the magnetic zonal marker 15 in the direction in which the road extends. Also in this figure, designated at the reference numeral 21 is a magnetism sensor detecting the magnetic field of the magnetic zonal marker 15 which forms a reference point marker detection means loaded on the vehicle 3 for detecting a magnetic field around the magnetic zonal marker 15, and at the reference numeral 22 a receiving antenna constituting a receiving means for the radio beacon 12 for road-to-vehicle communication. The magnetic sensor 21 is attached to a lower section in the front side of the vehicle, while the receiving antenna 22 is set inside the vehicle or attached to an upper section outside the vehicle. The reference numeral 23 indicates an in-vehicle detector comprising a receiving means for determining a communication area for the radio beacon 12 for road-to-vehicle communication based on an output from the receiving antenna 22 and a reference position detection means for detecting a position of a reference marker over which the vehicle passes based on an output from the magnetic sensor 21. The reference numeral 16 indicates a direction in which the vehicle is running.

In each of the figures described above, at first when the vehicle 13 runs on the road 1 in a direction 16 to the magnetic zonal marker 15 and enters the communication area 14 for the radio beacon 12 for road-to-vehicle communication, the vehicle 13 receives an electrical wave from the radio beacon 12 for road-to-vehicle communication by the receiving antenna 22 with the received electrical wave demodulated by the on-road detector 23, and determines that the communication has been established, and then the vehicle 12 receives information delivered from the radio beacon 12 for road-to-vehicle communication and indicating a distance from the reference point to a position indicated by information concerning a situation in the forward direction of the road such as a linear form of the direction or information indicating an absolute position on the road 1. The in-vehicle detector 23 on the vehicle 13 continuously measures the magnetic field amplitude in the vertical direction with the magnetism sensor 21 and detects a peak point 19*a* shown as a peak form when the vehicle 13 passes over the magnetic zonal marker 15 in the magnetic field distribution 19 in the direction in which the road extends.

When the peak point 19*a* is detected, the in-vehicle detector 23 determines that the position corresponding to the peak point 19*a* on which the vehicle 13 has passed is within the communication area 14 for the radio beacon 12 for road-to-vehicle communication and further that the peak point is the first peak point 19*a* detected at first after the vehicle 13 entered the communication area 14, and recognizes the point corresponding to the peak point as a reference position in a direction in which the road extends. On the other hand, when there is (are) other peak point(s) within the communication area 14, the in-vehicle detector 23 aborts the data. The vehicle 13 recognizes the position corresponding to the peak point 19*a* detected by the in-vehicle detector 23 as a reference point for the reference point distance delivered from the radio beacon 12 for road-to-vehicle communication or an absolute position on the road.

It is better to use a two-axial magnetism sensor which can detect the magnetic field amplitudes along the two axial directions, namely an amplitude of the magnetic field Bz in the vertical direction and an amplitude of the magnetic field Bx in the lateral direction of the lane, as the magnetism sensor 21 to identify the magnetic zonal marker 15, and when the peak point 19*a* is detected from the amplitude of the magnetic field Bz in the vertical direction, the magnetism sensor 21 determines that the amplitude of the magnetic field Bx in the lateral direction of the lane is substantially zero, and also that the vehicle 13 has passed over the magnetic zonal marker 15.

In this example, a distance from a reference point to a point indicated by information concerning a situation in the front side of the road 1 such as a linear form of the road 1 or information concerning an absolute position on the road 1 is delivered from the radio beacon 12 for road-to-vehicle communication, and at the same time a point corresponding to the peak point 19*a* in the magnetic field Bz in the vertical direction for the first magnetic zonal marker 15 in the communication area 14 on the road 1 is used as a reference point for the information in a direction in which the road 1 extends, and therefore the vehicle 13 can accurately receive service information even within a small traveling distance and can advantageously detect a reference point for the service information with high precision.

In this example, further reference point positional data is delivered via the magnetic zonal marker 15 to separate an information delivery means from the reference point positional data delivery means, and information delivery is performed by the radio beacon 12 for road-to-vehicle communication, and therefore it is advantageously possible to deliver a vast quantity of information including not only information concerning a reference point, but also other information relating to the delivered service.

Figure 12:
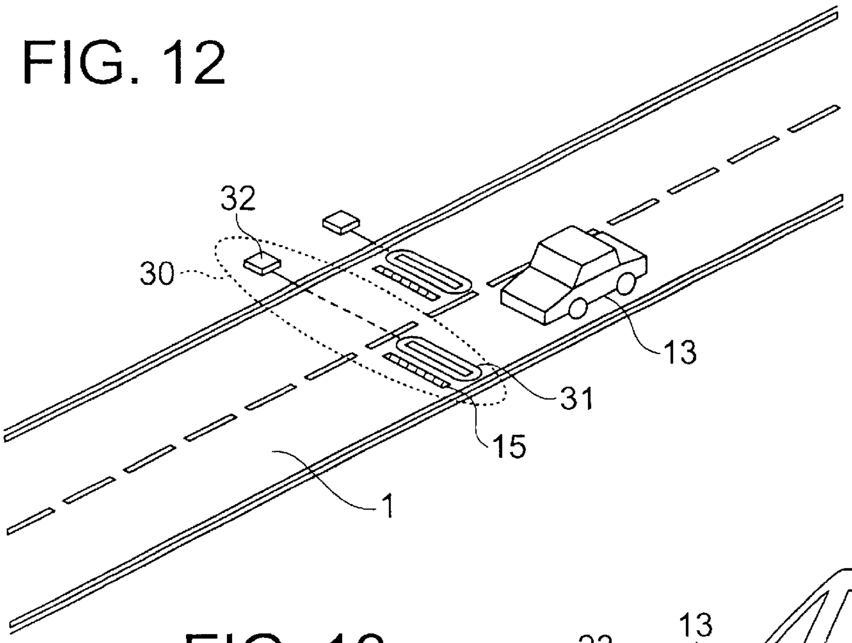
FIG. 12 is an explanatory view showing a magnetic field distribution of a magnetic zonal marker in the direction lateral to a lane in Example 2 of the embodiment.
Figure 13:
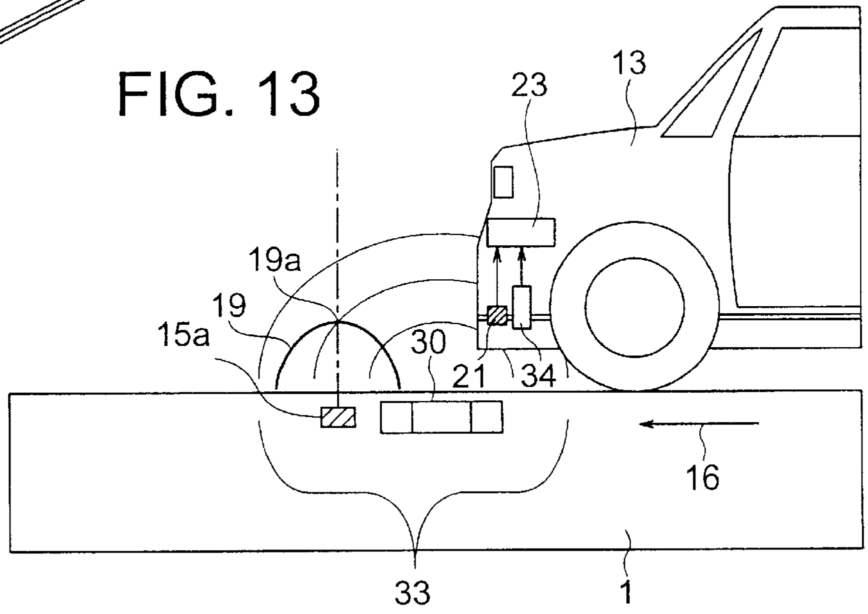
FIG. 13 is an explanatory view showing how a vehicle detects a lane marker based on the radio system and a magnetic zonal marker in Example 2 of the present invention.

FIG. 12 and FIG. 13 show Example 2 of the embodiment described above. In FIG. 12, the reference numeral 30 indicates a lane marker based on the radio system, which is like the lane markers 5*a* to 5*d* each based on the radio system in the embodiment of the present invention shown in FIG. 2. The reference numeral 31 indicates a transmission loop antenna section for the lane marker 30 buried in the road 1, and the transmission loop antenna section insures a communication area up to both edges of the lane by suing a loop antenna which is lengthy along the width of the lane. The reference numeral 32 indicates a road side processor for the lane marker 30 to transmit electrical waves from the antenna section 31 to over the road surface, and the antenna section 31 and the road side processor 32 are connected to each other with an electrical cable.

In FIG. 13, the reference numeral 33 indicates a communication area by an electrical wave transmitted from the antenna section 31 for the lane marker 30, and the magnetic zonal marker 15 is provided so that the peak point 19*a* in the magnetic field distribution 19 in the direction in which the road extends is within the communication area 33 as described above. The reference numeral 34 indicates a receiving antenna for a lane marker, which is attached to a lower section of the vehicle 13 at the front side thereof, and an output therefrom is given to the on-road detector 23.

In each of the figures above, the vehicle 13 runs in a direction 16 to the magnetic zonal marker 15, and at first when the vehicle 13 comes near the antenna section 31 for the lane marker 30 and enters the communication area 33, an electrical wave from the lane marker 30 is received by the receiving antenna 34 of the vehicle 13 with the received electrical wave demodulated by the on-road detector 23, the vehicle 13 determines that the communication with the lane marker 30 has been established, and receives information concerning a distance from a reference point up to a point indicated by information concerning a situation in the front direction of the road such as a linear form of the road 1 or information concerning an absolute position on the road 1. The in-vehicle detector 23 continuously measures an amplitude of the magnetic field in the vertical direction with the magnetism sensor 21, and detects the peak point 19*a* of the magnetic field distribution 19 in a direction in which the road extends.

Like Example 1 described above, when the in-vehicle detector 23 detects the peak point 19*a* of the magnetic field distribution 19 in the direction in which the road extends and it is determined that a position corresponding to the peak point 19*a* is within the communication area 33 for the lane marker 30 and that the peak point 19*a* is the first one after the vehicle 13 enters the communication area 33, the point corresponding to the peak point 19*a* is regarded as a reference point in the direction in which the road extends. If it is determined that there is (are) other peak point(s) within the communication area, the information is aborted. The vehicle 13 recognizes the position corresponding to the peak point 19*a* detected by the in-vehicle detector 23 as a reference point for information delivered from the lane marker 30 or as a reference point for information concerning an absolute position on the road.

In this example, it is possible for the vehicle 13 to accurately receive service information within a small traveling distance and also to advantageously detect a reference point for the service information with high precision. Further lane marker 30 based on the radio system is used as a means for road-to-vehicle communication, so that, as compared to the radio beacon 12 for road-to-vehicle communication which is installed in the road side together with a pole, the cost is cheaper and different information can advantageously be delivered for each lane.

Figure 14:
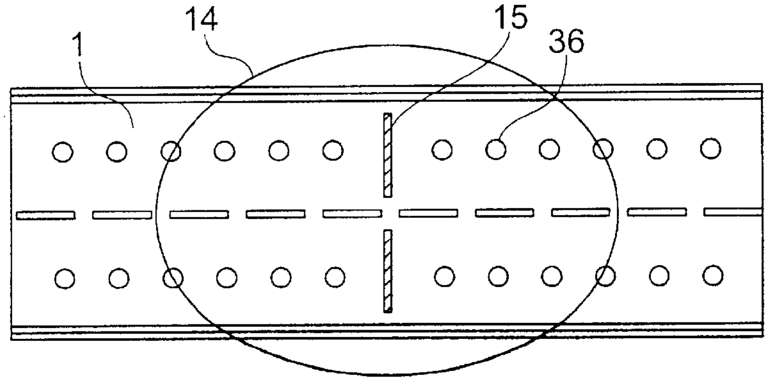
FIG. 14 is a view showing arrangement of reference point markers when a positional marker with the same polarity is present in Embodiment 3 of the embodiment.
Figure 15:
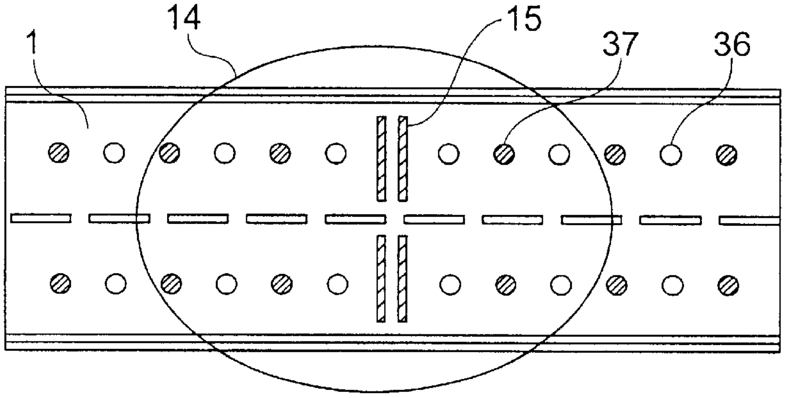
FIG. 15 is a flat view showing arrangement of reference point markers when a position marker with a different polarity is present in Example 3 of the embodiment.
Figure 16:
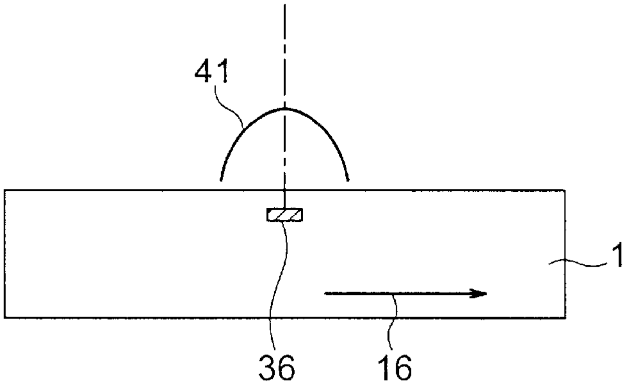
FIG. 16 is an explanatory view showing a magnetic field distribution on a position marker in a direction in which the road extends in Example 3 of the embodiment.
Figure 17:
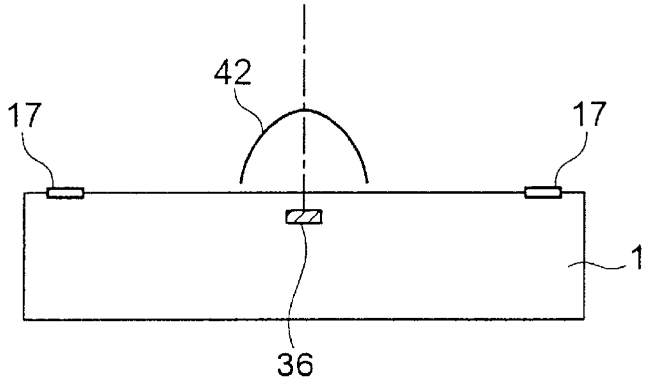
FIG. 17 is an explanatory view showing a magnetic field distribution of a position marker in the direction lateral to a lane in Example 3 of the embodiment.

FIG. 14 to FIG. 17 show Example 3 of the embodiment. In FIG. 14, the reference numeral 36 indicates a position marker functioning as a positional reference in the lateral direction of a lane on the road 1, and this position marker comprises a magnetic marker consisting of a magnet buried in the road 1 with the N-pole side positioned upward. N-porous magnetic marker 36 and the magnetic zonal marker 15 as a reference point marker are present in the communication area 14 by the radio beacon 12 for road-to-vehicle communication. As for the polarity of the magnetic zonal marker 15, the side closer to a surface of the road is the S pole, so that the polarity is contrary to that of the N-polarity magnetic marker 36 functioning as a position marker 36. The N-polarity magnetic marker 36 has the magnetic field distribution 41 in a direction in which the road extends as shown in FIG. 16, and at the same time has the substantially same magnetic field distribution 42 also in the lateral direction of the lane as shown in FIG. 17. In contrast, the magnetic zonal marker 15 has, as shown in FIG. 13, the magnetic field distribution 19 in the direction in which the road extends which is substantially the same as the magnetic field distribution 41 by the position marker in the direction in which the road extends as shown in FIG. 16, and also has the homogeneous magnetic field distribution 18 in the lateral direction of the lane as shown in FIG. 10.

Further in FIG. 14, when the vehicle enters the communication area 14 by the radio beacon 12 for road-to-vehicle communication from the right-hand side in the figure, the magnetism sensor 21 loaded in the vehicle detects both the N-polarity magnetic marker 36 and the magnetic zonal marker 15. However, as a polarity of the magnetic zonal marker 15 functioning as a reference point is S pole, the in-vehicle detector 23 determines the polarity and detects only S pole to differentiate the reference point marker from the position marker, and recognizes a position of the magnetic zonal marker 15 functioning as a reference marker as a reference position.

Next, FIG. 15 shows a case in which the N-polarity magnetic markers 36 and S-polarity magnetic markers 37 are provided alternately as position markers. The S-polarity magnetic marker 37 has the same magnetic field distribution as that of the N-polarity magnetic marker 36, but the polarity of the former is contrary to that of the latter. As for polarity of the magnetic zonal marker 15, the side closer to a surface of the road is S pole, and the two magnetic zonal markers 15 are arranged at both sides from the N-polarity magnetic marker 36 at a specified space therebetween in the direction in which the road extends. The space between the two magnetic zonal markers 15 must be sufficient to identify the peak points 19*a* of the two magnetic field distributions 19 from each other. Also the space between the S-polarity magnetic marker 37 and magnetic zonal marker 15 adjoining each other must be sufficient to identify the two magnetic field distributions in the direction in which the road extends from each other.

In FIG. 15, when the vehicle enters the communication area 14 by the radio beacon 12 for road-to-vehicle communication from the right-hand side in the figure, the magnetism sensor 21 loaded in the vehicle detects the N-polarity magnetic marker 36, S-polarity magnetic marker 37, and magnetic zonal marker 15. However, the polarity sequence detected by the in-vehicle detector 23 when passing over the two magnetic markers 15 is “NN”, and the polarity sequence when the position markers are successively detected is “SN”, so that the in-vehicle detector 23 can identify the magnetic zonal markers 15 each as a reference point marker based on the difference in the polarity sequence as described above, and recognizes a position of the magnetic zonal marker 15 which is the latter one of the two magnetic zonal markers 15 as a reference position. Even when the vehicle snakes in a lane, detects the N-polarity magnetic marker 36 once, and then detects the N-polarity magnetic marker 36 again without detecting the S-polarity magnetic marker 37, the polarity sequence detected by the in-vehicle detector 23 is “NN”, but the distance between the two N-polarity magnetic markers 15 detected in this case is substantially different from that detected in the ordinary running mode, and therefore the in-vehicle detector 23 determines by computing the distance between two points corresponding to the two peak points respectively based on a velocity of the vehicle that a space between the two magnetic zonal markers 15 detected as “NN” in this case is different from that detected in the ordinary running mode, and aborts the data.

In this example, also the same advantages as those described in the example described above are provided, and by providing in a communication area by a radio beacon for road-to-vehicle communication reference point markers with the different polarity sequence from that of other magnetic markers also provided in the communication area, it is possible to advantageously and easily identify a reference point marker even when the reference point markers and magnetic markers for positional detection used for delivery of information on a positional reference in the lateral direction of a lane are present in the same communication area.

Although the radio beacon 12 for road-to-vehicle communication is used as an information delivery means in the example described above, a radio marker 30 may be provided adjacent to the magnetic zonal marker 15 for delivery of information.

Further it is needless to say that the S-polarity magnetic markers and N-polarity magnetic markers may be used in the reverse order in the example described above.

Figure 18:
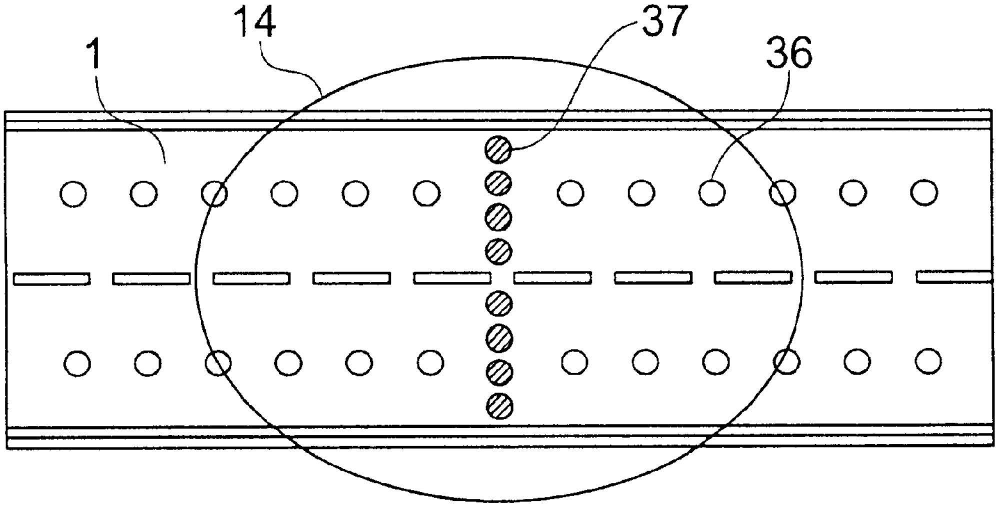
FIG. 18 is a flat view showing arrangement of reference point markers in a case where the reference point markers are formed with markers equivalent to the position markers respectively in Example 4 of the embodiment.
Figure 19:
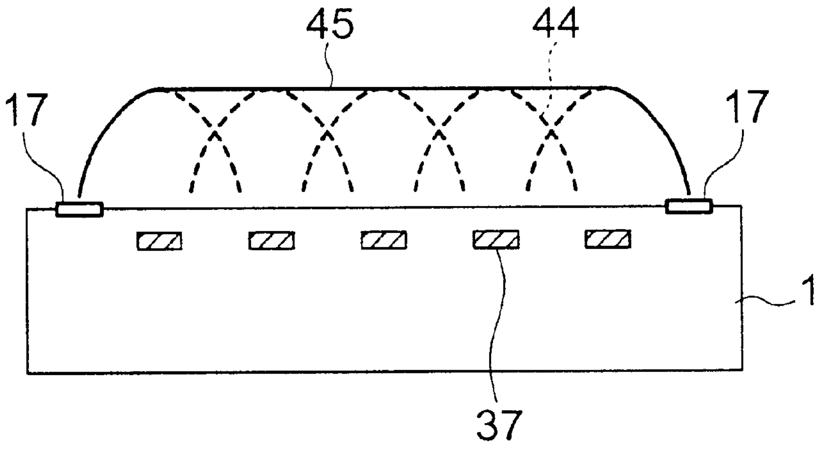
FIG. 19 is an explanatory view showing a magnetic field distribution in a direction of a lane in a case where the reference point markers are formed with markers equivalent to the position markers respectively in Example 4 of the embodiment.
Figure 20:
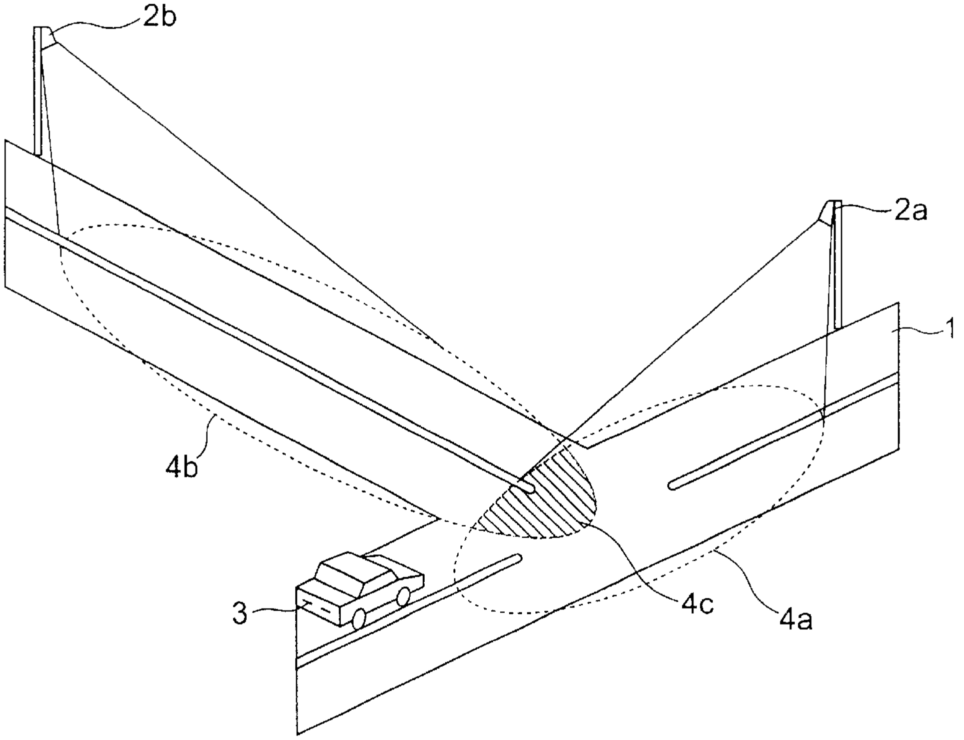
FIG. 20 PRIOR ART
FIG. 20 is a perspective view showing general configuration of a beacon based on the conventional technology.

FIG. 18 and FIG. 19 show Example 4 of the embodiment. In FIG. 18, the reference point marker is formed by arranging a plurality of S-polarity magnetic markers 37 each functioning as a position marker along a straight line extending in the lateral direction of a lane, and as shown in FIG. 19, the S-polarity magnetic markers are arranged with a space therebetween so that the magnetic field distributions 44 in the lateral direction of the lane for each S-polarity magnetic markers form, when overlaid on each other, a substantially homogeneous magnetic field distribution 45 in the lateral direction of the lane.

The same effects as those described in the example described above can be achieved also in this example, and by using reference markers based on specifications similar to those of position markers used in mass, there is provided the advantage that the reference point markers can be prepared with low cost.

Description of the example above assumes a case where only the N-polarity magnetic marker 36 is present as a position marker, a position marker having another polarity may be used, and also the sequence of S-polarity and N-polarity magnetic markers may be reversed.

The examples of the two embodiments of the present invention are provided only to show presently preferable examples of the present invention, and it is needless to say that various changes and modifications are encompassed according to the necessity within a scope of the present invention.

What is claimed is:

1. An on-road reference point positional data delivery device provided on a road for sending information to an in-vehicle detector loaded in a vehicle running on a road comprising:

a reference point positional data delivery means, wherein said reference point positional data delivery means indicates a reference point position for service information delivered from a beacon provided on the road to the vehicle by means of road-to-vehicle communication and also has a beacon identification means for selecting a beacon sending said service information from among a plurality of beacons.

2. The on-road reference point positional data delivery device according to claim 1, wherein said reference point positional data delivery means is a lane marker provided on a road and the lane marker is completely buried in the road surface or a surface thereof is exposed on the road surface.

3. The on-road reference point positional data delivery device according to claim 2, wherein said lane marker transmits or reflects electrical waves to deliver information to a vehicle.

4. The on-road reference point positional data delivery device according to claim 2, wherein said lane marker comprises a plurality of magnets arranged on a road with the S poles or N poles of the magnets set to positions closer to a surface of the road, and information is delivered to a vehicle according to the sequence of S poles or of N poles.

5. The on-road reference point positional data delivery device according to claim 1, wherein the reference point positional data delivery means is a dedicated short range communication having a communication zone for road-to-vehicle communication restricted to a prespecified small area in a direction in which the road extends.

6. The on-road reference point positional data delivery device according to claim 1, wherein the reference point positional data delivery means comprises a collection of a plurality of zonal bodies on a surface of a road, and information is presented by the width of each zonal body or a sequence thereof.

7. The on-road reference point positional data delivery device according to claim 1 further comprising a beacon identification means, wherein said beacon identification means is a frequency identification means which identifies a frequency of a beacon currently delivering service information from among a plurality of frequencies.

8. The on-road reference point positional data delivery device according to claim 7 further comprising a frequency identification means, wherein a plurality of beacons for delivering service information are successively provided, and when frequencies of the beacons are different from each other, said frequency identification means identifies a frequency of a beacon from which the service information for the vehicle to receive is delivered.

9. The on-road reference point positional data delivery device according to claim 7, wherein a plurality of beacons for delivering service information are successively provided, and when frequencies of the beacons are different from each other, a sequential number of a frequency for the vehicle to receive is assigned as sequence information to the service information.

10. An on-road reference point positional data delivery device provided on a road as well as in a vehicle comprising:

a radio beacon for road-to-vehicle communication provided on a road and having a narrow communication area in a direction in which the road extends for delivering information concerning a reference point distance from a reference point up to a point indicated by information concerning situations in a forward direction along the road or an absolute position on the road;

a reference point marker provided on a surface of the road within the communication area of said radio beacon for road-to-vehicle communication for indicating a reference position for said reference point distance or for an absolute position on the road surface;

a receiving means loaded in a vehicle for receiving signals from said radio beacon for road-to-vehicle communication;

a detection means loaded in the vehicle for detecting said reference point marker; and a reference position detection means also loaded in the vehicle for determining that the vehicle has entered the communication area by said radio beacon for road-to-vehicle communication and then passed over the reference point marker and also for recognizing a position of said reference point marker as the reference position.

11. The on-road reference point positional data delivery device according to claim 10, wherein said radio beacon for road-to-vehicle communication is a lane marker based on the radio system provided on a surface of a road and having a communication area within a specified range on the road surface.

12. The on-road reference point positional data delivery device according to claim 10, wherein said reference point marker is a magnetic marker solely provided within a communication range for said radio beacon for road-to-vehicle communication.

13. The on-road reference point positional data delivery device according to claim 10, wherein said reference point marker is a magnetic marker provided within a communication range for said radio beacon for road-to-vehicle communication and having a different polarity from that of another magnetic marker also provided in the communication range.

14. The on-road reference point positional data delivery device according to claim 10, wherein said reference point marker is a magnetic zonal marker which extends in the lateral direction of a lane.

* * * * *